UNITED STATES PATENT OFFICE 2,603,653

POLYETHYLENE GLYCOL ESTERS OF ALKYLMERCAPTOACETIC ACID

Milton Kosmin, Dayton, and Earl W. Gluesenkamp, Centerville, Ohio, assignors to Monsanto Chemical Company, St. Louis, Mo., a corporation of Delaware No Drawing. Application September 30, 1949, Serial No. 119,005

7 Claims. (Cl. 260—481)

The present invention provides polyethylene glycol esters of α-(tert. alkylmercapto) acetic acids.

One object of the present invention is the provision of a series of polyethylene glycol esters of α-(tert. alkylmercapto) acetic acid, which esters are of utility as surface active agents, particularly for use as detergents and wetting agents. A further object is the provision of sulfur-bearing alcohols containing an ester group, which materials are of considerable utility as lubricating oil additives, as detergents, insecticides, and are also useful for the production of plasticizing compositions.

According to the present invention, ethylene oxide is condensed with α-(tert. alkylmercapto) acetic acid in the ratio of from 1 to 30 moles of ethylene oxide per mole of said α-(tert. alkylmercapto) acetic acid. When the reaction is carried out at atmospheric pressure the temperature is maintained below about 150° C. When the reaction is carried out at higher pressures (e. g. 25–50 p. s. i.) a lower temperature may be used. In this case the products are somewhat lighter in color. The products may also be decolorized and deodorized by acidification and steam distillation or by treatment with active carbon or acid treated clays. The product so produced has a structural formula which may be written:

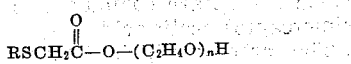

where R is a tertiary alkyl radical having from 8 to 16 carbon atoms and n has a value of from 1 to 30.

The α-(tert. alkylmercapto) acetic acid may be prepared by condensing a tertiary alkyl mercaptan having from 8 to 16 carbon atoms with chloracetic acid, as described in our copending application Serial No. 119,004, filed September 30, 1949, which application is assigned to the same assignee as is the present case.

As is more specifically described in the application above referred to, the α-(tert. alkylmercapto) acetic acid is prepared by condensing a tertiary alkyl mercaptide (prepared by the action of sodium or potassium hydroxide on the mercaptan) with an alkali metal salt of chloracetic acid. The condensation may be carried out by combining water solutions of the mercaptide and the salt of chloracetic acid, the temperature of reaction being maintained below about 50° C. The product, α-(tert. alkylmercapto) acetic acid, is isolated by acidifying the aqueous solution of the salts and extracting the desired compounds with suitable solvents.

The tertiary alkyl mercaptans which are reacted with chloracetic acid to form the α-(tert. alkylmercapto) acetic acid are those resulting from the sulfhydration of polymer olefins, particularly those olefins derived from the polymerization of lower olefins, such as propylene or butylene and mixtures thereof. Polymer olefins particularly suitable for the present purpose are: diisobutylene, triisobutylene, tetraisobutylene, tripropylene, tetrapropylene and pentapropylene. Sulfhydration of the olefin to form mercaptans may be carried out as described in United States Patent 2,392,555. These mercaptans are characterized by having the sulfur bonded to a carbon, which carbon is also bonded to three carbon atoms, the whole forming a hydrocarbon branched structure.

The following examples further illustrate this invention:

EXAMPLE 1

212 g. of α-(tert. dodecylmercapto) acetic acid was placed in a glass flask provided with the gas disperser, a stirrer, thermometer and gas outlet. 2.1 g. of KOH was added and ethylene oxide gas passed in, the temperature of the reacting mixture being kept at about 110° C. The ethylene oxide was rapidly absorbed until approximately one mole of ethylene oxide had combined with the mercapto acetic acid. The product was a dark-colored liquid and consisted of the monoethylene glycol ester of α-(tert. dodecylmercapto) acetic acid. The structural formula of the product is:

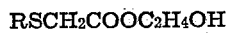

where R is the tertiary dodecyl radical.

EXAMPLE 2

212 g. of α-(tert. dodecylmercapto) acetic acid containing 1% of KOH was treated with ethylene oxide gas as described in Example 1 above, the temperature of treatment being from 110° C. to 120° C. After the equivalent of one mole of ethylene oxide had combined per mole of tertiary mercapto acetic acid, the rate of absorption decreased somewhat, whereupon the temperature was raised to 135° C. and treatment with ethylene oxide continued at this temperature. After the equivalent of 5 moles of ethylene oxide per mole of mercaptoacetic acid had combined, a sample of the product was removed from the reactor. It was a dark-colored, oily, viscous liquid. The structural formula of the product was:

$$RSCH_2COO(C_2H_4O)_5H$$

which corresponds to the pentaethylene glycol ester of α-(tert. dodecylmercapto) acetic acid.

A water solution containing 0.5% of the above product was tested by the Draves test and found to give a wetting time of 7.2 seconds on cotton.

EXAMPLE 3

The balance of the product produced in Example 2 above, after removal of the sample, was reacted with additional ethylene oxide, the temperature being maintained at 140° C. to 145° C. until the equivalent of 10 moles of ethylene oxide per mole of mercaptoacetic acid had combined therewith. At this stage a further sample of the product was removed. This latter sample corresponded to the decaethylene glycol ester of α-(tert. dodecylmercapto) acetic acid, the formula of which is:

$$RSCH_2COO(C_2H_4O)_{10}H$$

EXAMPLE 4

The balance of the product produced in Example 3, after removal of the sample mentioned, was treated at a temperature of 140° C. to 145° C. with a further quantity of ethylene oxide. Upon reaching an ethylene oxide content of 15 moles combined with said mercapto acetic acid, the flow of ethylene oxide was interrupted and a sample removed therefrom. This product was the pentadecyl ethylene glycol ester of α-(tert. dodecylmercapto) acetic acid, corresponding to the formula:

$$RSCH_2COO(C_2H_4O)_{15}H$$

EXAMPLE 5

The balance of the product produced in Example 4 above, was further treated with additional ethylene oxide at a temperature of 140° C. to 145° C. and upon reaching a content of combined ethylene oxide equivalent to 20 moles of ethylene oxide per mole of tertiary mercaptoacetic acid, the flow of gas was interrupted and a sample removed. The product corresponded to a composition represented by the formula:

$$RSCH_2COO(C_2H_4O)_{20}H$$

where R represents a tertiary dodecyl radical.

To illustrate the detergent properties of the present products, samples of detergent were prepared by mixing 20 parts of the product of each of Examples 3, 4 and 5 with 40 parts by weight of finely divided tetra-sodium pyrophosphate and 40 parts of starch. From the composition so prepared, detergent solutions were made containing 0.2% by weight of the detergent composition in water, the water having for the purposes of the test 50 parts per million and 300 parts per million of hardness. The solutions so prepared were tested according to the standard Launderometer procedure, as described by Jay C. Harris in Soap and Sanitary Chemicals, for August and September, 1943. The detergent values were compared with the detergency of a representative sample of Gardinol (sodium lauryl sulfate) the detergency of which was taken to be 100%. The relative detergencies resulting from this comparison were as follows:

*Relative detergency, per cent*

| Water Hardness | 50 p. p. m. | 300 p. p. m. |
| --- | --- | --- |
| | Percent | Percent |
| Product of Ex. 3 | 113 | 103 |
| Product of Ex. 4 | 105 | 110 |
| Product of Ex. 5 | 106 | 114 |

In place of the tetrasodium pyrophosphate and starch employed above, other builder salts may be employed for detergent formulations. Suitable salts may be sodium sulfate, sodium carbonate, sodium bicarbonate, sodium sesquicarbonate, trisodium phosphate, sodium tripolyphosphate, disodium orthophosphate. In some cases it may be desirable to employ carboxy methyl cellulose, in which case from 0.5% to 5% by weight may be used. When builder salts are employed they may be utilized in the anhydrous or in the hydrated form and in amount varying from 50% to 85% by weight of the detergent composition, the balance thereof being the active constituent. By this means the proportion of active constituent may be reduced and the cost of the detergent composition greatly decreased.

What we claim is:

1. Products having the formula:

$$RSCH_2COO(C_2H_4O)_nH$$

where R is a tertiary dodecyl radical and $n$ is an integer having a value of from 1 to 30.

2. The α-(tert. dodecylmercapto) acetic acid ester of ethylene glycol.

3. The α-(tert. dodecylmercapto) acetic acid ester of polyethylene glycol.

4. The process which comprises condensing ethylene oxide with an α-(tert. alkylmercapto) acetic acid, wherein the alkyl group has from 8 to 16 carbon atoms.

5. The process which comprises condensing ethylene oxide with an α-(tert. alkylmercapto) acetic acid, wherein the alkyl group has from 8 to 16 carbon atoms until from 1 to 30 moles of ethylene oxide have combined with said α-(tert. alkylmercapto) acetic acid.

6. The process which comprises condensing ethylene oxide with α-(tert. dodecylmercapto) acetic acid.

7. The process which comprises condensing ethylene oxide with α-(tert. dodecylmercapto) acetic acid until from 1 to 30 moles of ethylene oxide have combined with said α-(tert. dodecylmercapto) acetic acid.

MILTON KOSMIN.
EARL W. GLUESENKAMP.

No references cited.